United States Patent [19]

Leitch

[11] Patent Number: 5,029,187
[45] Date of Patent: Jul. 2, 1991

[54] DIGITAL CORRELATION RECEIVER

[75] Inventor: Clifford D. Leitch, Coral Springs, Fla.

[73] Assignee: Motorola, Inc., Schaumburg, Ill.

[21] Appl. No.: 354,608

[22] Filed: May 22, 1989

[51] Int. Cl.$^5$ .............................................. H04L 27/06
[52] U.S. Cl. ........................................ 375/96; 375/103
[58] Field of Search .................. 375/96, 99, 101, 103, 375/102; 455/303-305, 222, 224; 329/318

[56] References Cited

U.S. PATENT DOCUMENTS 3,573,621  4/1971  Ulstad .................................... 375/96
4,580,139  4/1986  Weathers et al. ................... 342/189

Primary Examiner—Douglas W. Olms
Assistant Examiner—Tesfaldet Bocure
Attorney, Agent, or Firm—Michael J. Buchenhorner

[57]  ABSTRACT

A digital correlation receiver, having one or more filters, that uses a modified correlation waveform to undo or eliminate the effects of distortion of the received signal. A distorted information signal is applied to a multiplifer for multiplication by a correlation waveform that has been modified to eliminate the distortion present in the received information signal. The product of the information signal and the correlation waveform is then integrated and a bit decision is made at the output of the integrator. The accuracy of the bit decision is enhanced by the elimination of the effects of the signal distortion.

15 Claims, 2 Drawing Sheets

DIGITAL CORRELATION RECEIVER

TECHNICAL FIELD

This invention relates generally to correlation-type digital receivers. More particularly, the invention relates to a correlationtype receiver wherein the correlation waveform is modified or distorted in such a manner that the effect of distortion present in the radio frequency information signal is substantially eliminated at the output of the receiver.

BACKGROUND ART

Known receivers use the correlation method to implement an optimum bit decision (i.e., whether a logic "1" or "0" was received). In such receivers, the received information signal is multiplied by a correlation pulse and their product is integrated for a specific period of time. However, practical IF filters, required to give the receiver acceptable selectivity, frequently cause severe distortion of the waveforms of the received signals. With such distortion, the correlation method does not work correctly because the resulting intersymbol interference causes errors in the received information or data. This signal distortion frequently results in an unacceptably high error rate for the receiver.

One known way to compensate for the effects of IF filter distortion is to predistort the information signal in the transmitter. This has two disadvantages. First, the same IF filter must be used in all receivers, thus limiting flexibility in the design of the receiver. Second, the predistortion may impart undesired characteristics to the transmitted signal, such as splatter and high peak amplitude.

Another known method is to incorporate gain/phase equalization into the receiver in an attempt to restore the original waveform of the signal (i.e., to undo the distortion) before the correlation operation. This practice, however adds substantial complexity to the receiver whether compensation is implemented in analog or digital form.

SUMMARY OF THE INVENTION

Accordingly, it is an object of the present invention to provide a correlation receiver that eliminates the data error problem caused by the distortion of the received signal and that avoids the problems present in the prior art.

Briefly, according to the invention, the correlation signal, to be multiplied by the received information signal, is modified or distorted so that the integral of their product is free of the effects of the subject distortion. The modification of the correlation waveform required by the invention is determined by characterizing the distortion caused by the IF filter (and other filters in the receiver) and calculating a correction factor that undoes or eliminates the effects of the signal distortion.

DETAILED DESCRIPTION OF THE PREFERRED EMBODIMENT

Figure 1:
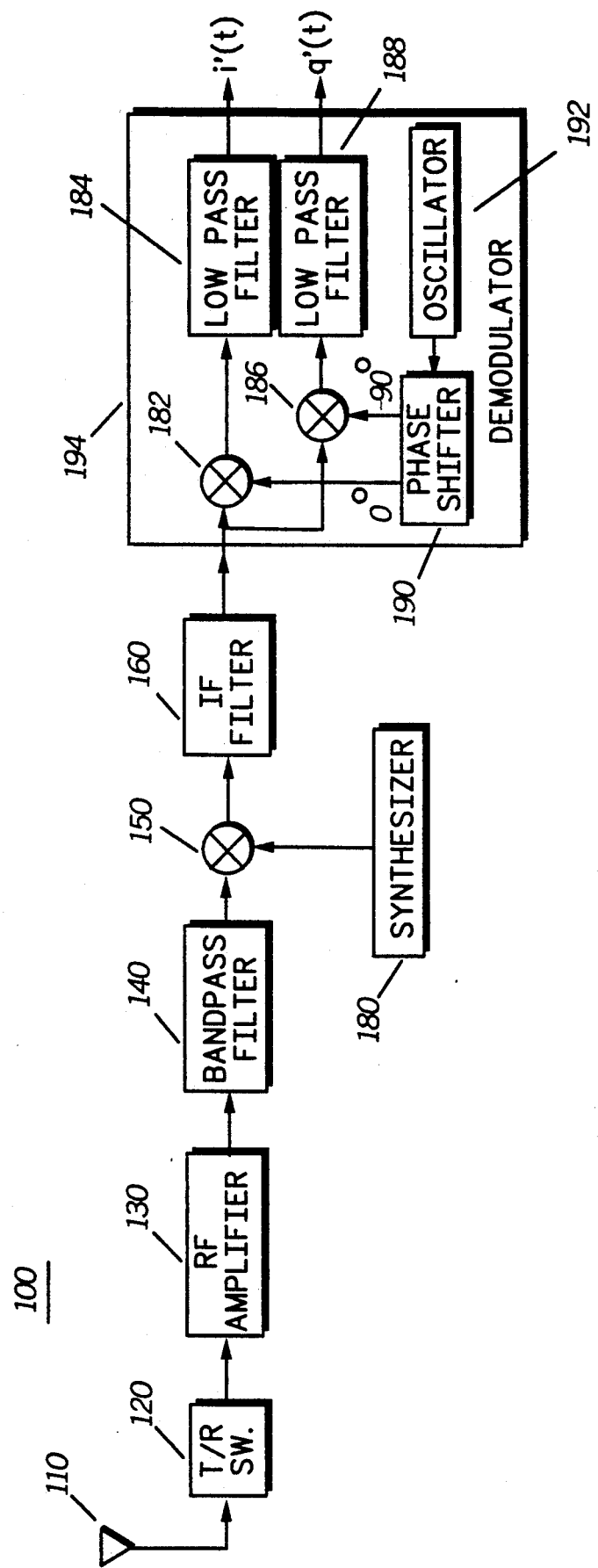
FIG. 1 is a block diagram of the front end of a radio receiver in accordance with the present invention.

Referring to FIG. 1, a block diagram of the front end of a linear-type radio receiver 100 is shown. A digital radio frequency (RF) information signal is received at the antenna 110, (which is coupled to a transmit/-received switch 120). When the switch 120 is in the "receive" position, the RF information signal is applied to an RF amplifier 130. The amplified RF signal is then filtered by a bandpass filter 140, which is coupled to the RF amplifier. The filtered RF signal is then mixed by mixer 150, with a signal supplied by a frequency synthesizer 180. Thus, an intermediate-frequency (IF) signal is provided by the mixer 150 to the IF filter 160. The filtered IF information signal, i(t), is finally demodulated by demodulator 194. The demodulator 194 demodulates the inphase and quadrature components of the filtered IF signal by multiplying (194) each with a periodic signal generated by an oscillator 192 and passed (unshifted) through phase-shifter 190. The output of multiplier 182 is applied to a low pass filter 184, which produces the demodulated in-phase information signal, i(t).

Additionally, the information signal leaving the IF filter is also multiplied (186) by a periodic signal produced by an oscillator 192 and phase-shifted by minus ninety degrees by a phase shifter 190. The output of the multiplier 186 is applied to a low pass filter 188, which produces a quadrature signal q'(t). All the operations illustrated herein are for the i' component of the information signal. As is well known to those of ordinary skill in the art, the operations on the q' component are similar.

The IF filter 160, and other filters in the receiver, distort the information signal received by the receiver. Thus, the signal i(t) produced by demodulator 194 is likewise distorted.

Figure 2:
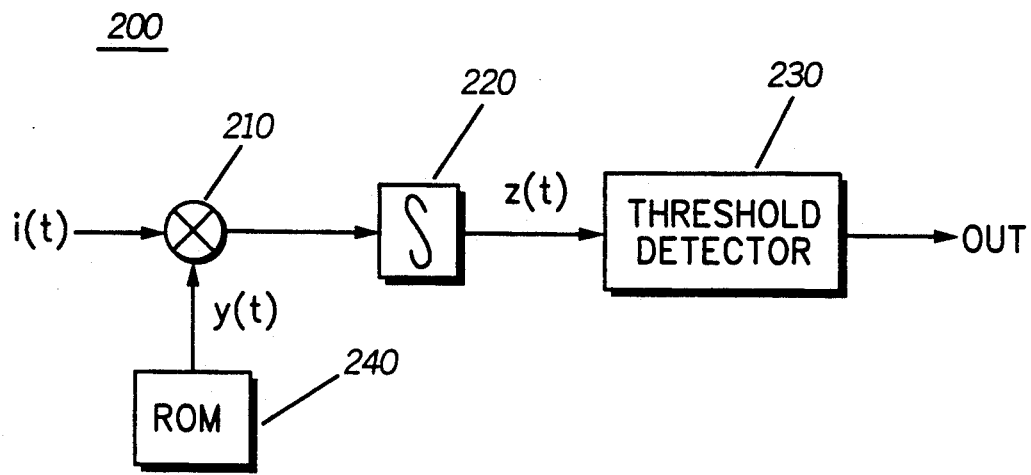
FIG. 2 is a block diagram of a conventional correlation receiver without the front end.

Referring to FIG. 2, the operation of a conventional correlation-type digital radio receiver 200 is shown in block-diagram form. The received signal, i(t), is applied to one input of a multiplier 210 for multiplication by a correlation waveform, y(t), which is applied to the other input of the multiplier 210. The correlation waveform y(t) is preferably a digital signal that is stored in a read-only memory (or "ROM") 240 in the receiver. Following the multiplication of signals i(t) and y(t), their product is applied to an integrator 220, which produces a signal z(t), representing the integral of the product of i(t) and y(t) over a specific period of time. The signal z(t) is a function of the similarity of waveforms i(t) and y(t). A threshold detector 230 is used to make a bit decision (i.e., whether a logic "one" or "zero" was received) based on the result of the integration, signal z(t). Ideally, if i(t) and y(t) are signals having finite energy, then $$z(t) = \int_{-\infty}^{\infty} i(t)y(t)dt \quad (1)$$

However, in practice the limits of the integration for each bit decision are dependent on the length the waveform y(t), which is zero outside a specific range of times.

As previously discussed with respect to FIG. 1, the bandpass IF filter 160 (and other filters) cause distortion of the received signal i(t). The result is intersymbol interference in the correlation process and consequent errors in the bit decisions.

Figure 3:
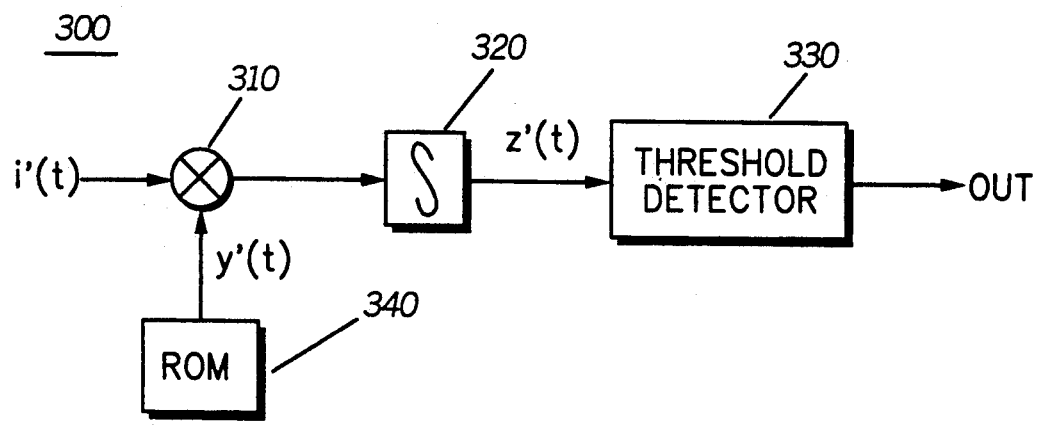
FIG. 3 is a block diagram of a correlation receiver wherein the information signal received has been distorted and the correlation signal has been modified to compensate for the distortion.

Referring to FIG. 3, block diagram 300 illustrates the same correlation receiver scheme of FIG. 2 with a different set of input signals. In this case, the received signal i'(t) is distorted in a particular way by the IF filter 160 and other filters in the receiver. Such distortion may be characterized by a function known as an impulse response. The relationship of the distorted signal, i'(t), to the received (undistorted) signal, i(t), is defined as follows.

$$i'(t) = i(t) * h(t) \tag{2}$$

where * is the convolution operator and h(t) represents the impulse response of the entire chain of filters causing the distortion, as seen at i'(t) or at q'(t).

Signal i'(t) is applied to one input of a multiplier 310 where it is multiplied by correlation signal y'(t), which is supplied at the other input of the multiplier 310, from a ROM 340. The product of i'(t) and y'(t) is supplied by the multiplier 310 to an integrator 320 for integration thereof for a specific period of time. The result of that integration is the production of an output signal, z'(t), at the output of the integrator 320. The signal z'(t) is then applied at the input of threshold detector 330, which makes a bit decision based on z'(t). In the case of binary transmission, the bit decision is "1" if z'(t) $\geq$ 0 and "0" if z(t) < 0.

Thus, there exists a correlation signal y'(t) such that:

$$z'(t) = \int_{-\infty}^{\infty} i'(t)y'(t)dt = \int_{-\infty}^{\infty} i(t)y(t)dt = z(t) \tag{3}$$

Thus, in the preferred embodiment, the appropriate correlation signal y'(t) would be selected and stored in the ROM 340 to be multiplied by the distorted information signal i'(t) when required. An output signal z'(t) may now be obtained, as a result of the correlation, which is exactly the same as the output signal z(t) obtained when no distortion is present in the received signal. In other words, the effects of signal distortion are undone or eliminated by using an appropriately modified correlation waveform.

The procedure to select the appropriate correlation waveform in accordance with the present invention is set forth below. First, letting i'(t)=i(t)* h(t), where h(t) is known, and y'(t)=y(t)* g(t), where g(t) is an unknown correction factor. Then, taking the Fourier transforms of i'(t) and y'(t)

$$I'(f) = I(f)H(f), \text{ and} \tag{4}$$

$$Y'(f) = Y(f)G(f) \tag{5}$$

where f represents frequency.

Applying Parseval's Theorem, $$z'(t) = \int_{-\infty}^{\infty} i'(t)y'(t)dt = \frac{1}{2\pi} \int_{-\infty}^{\infty} I'(-f)Y'(f)df \tag{6}$$

-continued $$z'(t) = \frac{1}{2\pi} \int_{-\infty}^{\infty} I(-f)Y(f)H(-f)G(f)df \tag{7}$$

Next, let H(-f) G(f)=1, or G(f)=1/H(-f).

Then, the product of X(-f) and Y(f) is integrated as shown below.

$$z'(t) = \frac{1}{2\pi} \int_{-\infty}^{\infty} I(-f)Y(f)df \tag{8}$$

Applying Parseval's Theorem again, an expression is obtained where z'(t)=z(t).

$$z'(t) = \frac{1}{2\pi} \int_{-\infty}^{\infty} I(-f)Y(f)df \tag{9}$$

$$z'(t) = \int_{-\infty}^{\infty} i(t)y(t)dt = z(t) \tag{10}$$

Thus, by: (1) letting the Fourier transform of the unkown correction factor, g(t), equal the reciprocal of the Fourier transform, H(-f), of the known impulse response h(t) of the receiver filters; (2) finding the Fourier transform Y'(f), of correlation signal y'(t), by taking the product of Y(f) and G(f); and (3) taking the inverse Fourier transform of Y'(f) to find the new correlation waveform y'(t) to be stored in the ROM for correlation with the signal i'(t), the effects of the signal distortion are eliminated.

What is claimed is:

1. A digital correlation receiver, comprising: receiving means for receiving an information signal, said receiving means producing a distorted information signal for correlation; and correlation means coupled to said receiving means, for correlating the distorted information signal with a correlation waveform preselected to compensate for the effects of the distortion of the distorted information signal.

2. The digital correlation receiver, of claim 1, further comprising:

a multiplier, coupled to the receiving means, for multiplying the distorted information signal by the correlation waveform.

3. The digital correlation receiver of claim 2, further comprising:

storage means for storing the correlation waveform, said storage means being coupled to the multiplier for application of said correlation waveform to the multiplier.

4. The digital correlation receiver of claim 3, further comprising:

an integrator, coupled to said multiplier, for integrating the product of the distorted information signal and the correlation waveform for a specific period of time, whereby the effects of distortion of the distorted information signal are substantially eliminated at the output of said integrator.

5. The correlation receiver of claim 4, wherein the correlation waveform comprises a signal that correlates with the information signal before said information signal is distorted by the receiving means, so that the effects of the distortion of the distorted information signal are substantially eliminated at the output of the correlation receiver.

6. The correlation receiver of claim 5, wherein the correlation waveform comprises the inverse Fourier transform of the quotient of the Fourier transform of a correlation waveform, that correlates with the information signal before said information signal is distorted by the receiving means, divided by the Fourier transform of the impulse response of the receiving means, said Fourier transform of the impulse response being a function of negative frequency.

7. The correlation receiver of claim 5, wherein the receiving means comprises a filter, said filter causing the distortion of the information signal.

8. The correlation receiver of claim 7, wherein the filter is an intermediate frequency filter.

9. The correlation receiver of claim 8, wherein the storage means comprises a read only memory.

10. A correlation method comprising:
 (a) receiving an information signal to provide a received signal;
 (b) filtering said received signal to provide a filtered signal, said filtered signal including a distortion component introduced by filtering; and
 (c) correlating said filtered signal with a correlation waveform preselected to compensate for said distortion components introduced by said filtering.

11. The method of claim 10, further comprising the step of (b1) multiplying the distorted information signal with the correlation waveform to generate a product.

12. The method of claim 11, wherein the correlation step is performed by integrating the product of the distorted information signal and the correlation waveform for a specific period of time, whereby the effects of distortion of the distorted information signal are substantially eliminated after the integration.

13. The method of claim 12, further comprising the step of storing the correlation waveform for correlation with the distorted information signal.

14. A method for generating a correlation waveform, in a linear-type radio receiver, for correlation with a distorted signal, comprising the steps of:
 receiving a signal;
 producing the distorted signal by introducing distortion into the signal, said distortion being produced in the receiver;
 determining an impulse response that characterizes the distortion caused by the receiver; and
 distorting a waveform that correlates with the signal before said signal is distorted by the receiver to produce a correlation waveform, so that the effects of the distortion are substantially eliminated after correlation of the distorted signal with the correlation waveform.

15. The method of claim 14, further comprising:
 determining the Fourier transform of a waveform, that correlates with the signal before said signal is distorted by the receiver;
 determining the Fourier transform of the impulse response of the receiver;
 determining the quotient of the Fourier transform of the waveform divided by the Fourier transform of the impulse response of the receiver, said Fourier transform of the impulse response being a function of negative frequency; and
 determining the inverse Fourier transform of said quotient.

* * * * *